(12) United States Patent
Bexell et al.

(10) Patent No.: US 8,022,596 B2
(45) Date of Patent: Sep. 20, 2011

(54) GUIDED ELECTROMECHANICAL MOTOR (75) Inventors: Mats Bexell, Bjorklinge (SE); Per Oskar Lithell, Uppsala (SE)

(73) Assignee: PiezoMotor Uppsala AB, Uppsala (SE)

( * ) Notice: Subject to any disclaimer, the term of this patent is extended or adjusted under 35 U.S.C. 154(b) by 370 days.

(21) Appl. No.: 12/333,774

(22) Filed: Dec. 12, 2008

(65) Prior Publication Data
US 2010/0148629 A1 Jun. 17, 2010

(51) Int. Cl.
*H02N 2/16* (2006.01)
(52) U.S. Cl. .............. 310/323.02; 310/323.05
(58) Field of Classification Search .......... 310/323
See application file for complete search history.

(56) References Cited

U.S. PATENT DOCUMENTS

| | | | | |
|---|---|---|---|---|
| 4,630,941 A | * | 12/1986 | Chainer et al. | 384/1 |
| 4,672,256 A | * | 6/1987 | Okuno et al. | 310/323.07 |
| 4,857,793 A | * | 8/1989 | Okuno | 310/323.02 |
| 4,866,326 A | * | 9/1989 | Niikawa et al. | 310/315 |
| 5,053,670 A | * | 10/1991 | Kosugi | 310/328 |
| 2005/0275315 A1 | | 12/2005 | Manabe et al. | |
| 2008/0174206 A1 | | 7/2008 | Sakamoto | |

FOREIGN PATENT DOCUMENTS
JP 2001292584 A 10/2001

OTHER PUBLICATIONS
International search report in corresponding application No. PCT/EP2009/066886 dated May 10, 2010.
Written Opinion in corresponding application No. PCT/EP2009/066886 dated May 10, 2010.

* cited by examiner

*Primary Examiner* — J. SanMartin
(74) *Attorney, Agent, or Firm* — Young & Thompson (57) ABSTRACT

An electromechanical actuator arrangement (50) comprises an electromechanical motor (10) and a rail arrangement (35). The rail arrangement (35) has a rail (30) relative which the electromechanical motor drives in a main displacement direction (3). The electromechanical motor has electromechanically active actuators attached to a motor block (20) and are arranged to provide an actuating action against the rail. The rail arrangement has further at least one guide member (31) provided parallel to the main displacement direction. The guide members have a guiding surface (36) facing the motor block. The motor block in turn has guidance surfaces (37) facing the guiding surface of the guide members. The guiding surface or the guidance surface has a tangent line parallel to the main displacement direction. The other one of the guiding surface and the guidance surface has a tangent surface in a second plane parallel to the first plane 20 Claims, 8 Drawing Sheets

GUIDED ELECTROMECHANICAL MOTOR

TECHNICAL FIELD

The present invention relates in general to actuator arrangements and in particular to small, high-precision actuator arrangements.

BACKGROUND

Electromechanical actuator arrangements have been used for many years to achieve energy-efficient and precise motion of different objects. Typical applications are motion of lenses in optical systems, positioning of objects under a microscope, control of ink jet nozzles, etc.

In a typical prior art electromechanical actuator system, an object to be moved is attached to a shuttle. The shuttle is moved by action of an electromechanical actuator. The load of the object and the shuttle is acting against a support part, typically by means of bearings. The bearings can be linear or rotational depending on the required motion. For high precision positioning applications, very high demands are put on the actuator as well as on the bearing arrangements. Typically, the actuator is responsible for the accuracy in the driving direction, i.e. the travel distance, while the bearing arrangement takes care of the flatness and straightness of the travel, as well as the yaw, pitch and roll accuracies. The standard linear bearings of today may provide flatness and straightness in the order of 2 µm, and pitch, roll and yaw accuracies down to about 100 µrad. Typical allowable loads can then be as high as 500 N.

A problem with electromechanical actuator systems of today is that the bearing arrangements add to the total volume and in order to further reduce sizes of the electromechanical actuator systems while maintaining or even improving the accuracies very expensive solutions according to prior art have to be considered. At the same time, the loads are often much lower than the maximum limit, giving a very high load margin.

SUMMARY

An object of the present invention is to provide an electromechanical actuator system for low-weight loads that is smaller, simpler and less expensive to produce, than prior art electromechanical actuator systems.

This object is achieved by electromechanical actuator arrangements according to the enclosed patent claims. In general words, in a first aspect, an electromechanical actuator arrangement comprises an electromechanical motor and a rail arrangement. The rail arrangement has a rail relative which the electromechanical motor drives in a main displacement direction. The electromechanical motor has electromechanically active actuators attached to a motor block and are arranged to provide an actuating action against a drive surface, parallel to the displacement direction, of the rail by means of an interaction portion. The electromechanically active actuators exhibit shape changes upon excitation, by which shape changes the actuating action is caused. The rail arrangement has further at least one guide member provided parallel to the main displacement direction. This at least one guide member has a guiding surface facing the motor block. The motor block in turn has a guidance surface facing the guiding surface of the at least one guide member. The guiding surface or the guidance surface has at least a tangent line in a first plane parallel to the main displacement direction and transverse to the drive surface. The other one of the guiding surface and the guidance surface has a tangent surface in a second plane parallel to the first plane.

In a second aspect, a method of driving an electromechanical actuator arrangement comprises driving of a rail of a rail arrangement relative to an electromechanical motor in a main displacement direction. The driving is performed by providing an actuating action of electromechanically active actuators of the electromechanical motor against the rail. The actuating action is in turn caused by shape changes of the electromechanically active actuators when being excited. The method further comprises guiding of a surface of a motor block, to which the electromechanically active actuators are attached, by interaction with at least one guide member of the rail arrangement provided parallel to the main displacement direction.

An advantage with the present invention is that the inherent good accuracy properties of electromechanical actuators can be utilized directly instead of having to use separate bearing arrangements.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present disclosures, equal or directly corresponding features in different figures and embodiments will be denoted by the same reference numbers.

Figure 1:
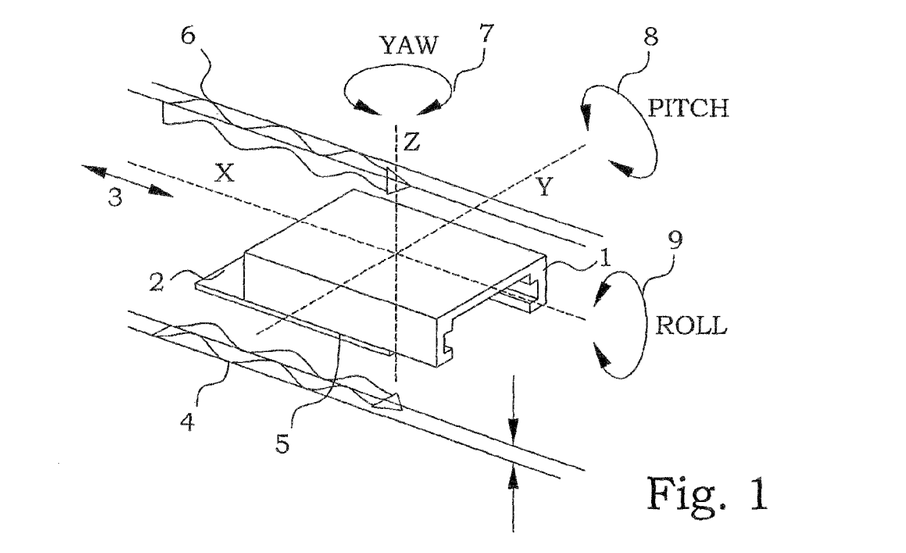
FIG. 1 is an illustration of definitions of movements and rotations in the relative motion of a static and movable part.

Throughout the present disclosure, different directions of displacements and rotations are discussed. In order to have the directions and rotations well defined, we use the definition as depicted in FIG. 1. A moving part 1 moves relative a stationary part 2 and interact via an interaction interface 5. An intended main travel direction or main displacement direction x is indicated by the arrow 3. During that travel, the moving part can be displaced or rotated in different ways. A flatness of travel is defined as the "up and down" displacement 4, i.e. a displacement in a direction z perpendicular to the interaction interface 5. A straightness of travel is instead defined as the side displacement 6, i.e. a displacement in a direction y along the interaction surface 5 but perpendicular to the travel direction x. Relative rotations can also be defined. A yaw rotation 7 is a rotation around an axis in the z direction, i.e. a rotation in the plane of the interaction interface 5. A pitch rotation 8 is a rotation around an axis in the y direction, i.e. a rotation perpendicular to the interaction interface 5. Finally, a roll rotation 9 is a rotation around an axis parallel to the travel direction x.

Electromechanical motor of today are designed with very high mechanical accuracies, in order to ensure enough accuracy in the positioning, i.e. enough accuracy in the travel. The exact accuracies vary with driving principle, size and application. However, some of the electromechanical motors themselves typically have good accuracies concerning at least flatness and typically also concerning pitch and roll. In most prior art applications, however, these high mechanical accuracies are not utilized for the final motion, which instead is controlled by the bearing accuracies.

Electromechanical motors have however typically two weak points concerning mechanical accuracy. Accuracy in straightness of the travel, as well as the yaw accuracy, is in most cases not very impressing. Fortunately, any forces in these directions are in many cases very small indeed. The present invention takes advantage of that insight, and provides an electromechanical actuator arrangement without traditional types of bearing arrangements. Instead, the mechanical accuracies of the electromechanical actuators themselves are used combined with simple guiding arrangements to improve the straightness and yaw accuracies.

Most actuator materials could be characterized as electromechanical materials, but in the present disclosure we intend to use the term electromechanical materials as materials that change their shape when an electric voltage or current is applied. Typical examples of electromechanical materials are piezoelectric, electrostrictive and antiferroelectric materials and these materials could be single crystalline as well as polycrystalline or amorphous.

As an exemplifying model system, an electromechanical actuator based on a PIEZO LEGS® motor, produced by the applicant, is used. However, the basic principle can be used together with also other types of electromechanical actuators. A non-exclusive example is electromechanical actuators operating according to the principle of stick-slip. In certain applications, even actuators operating according to resonance principles may be possible to use.

Figure 2:
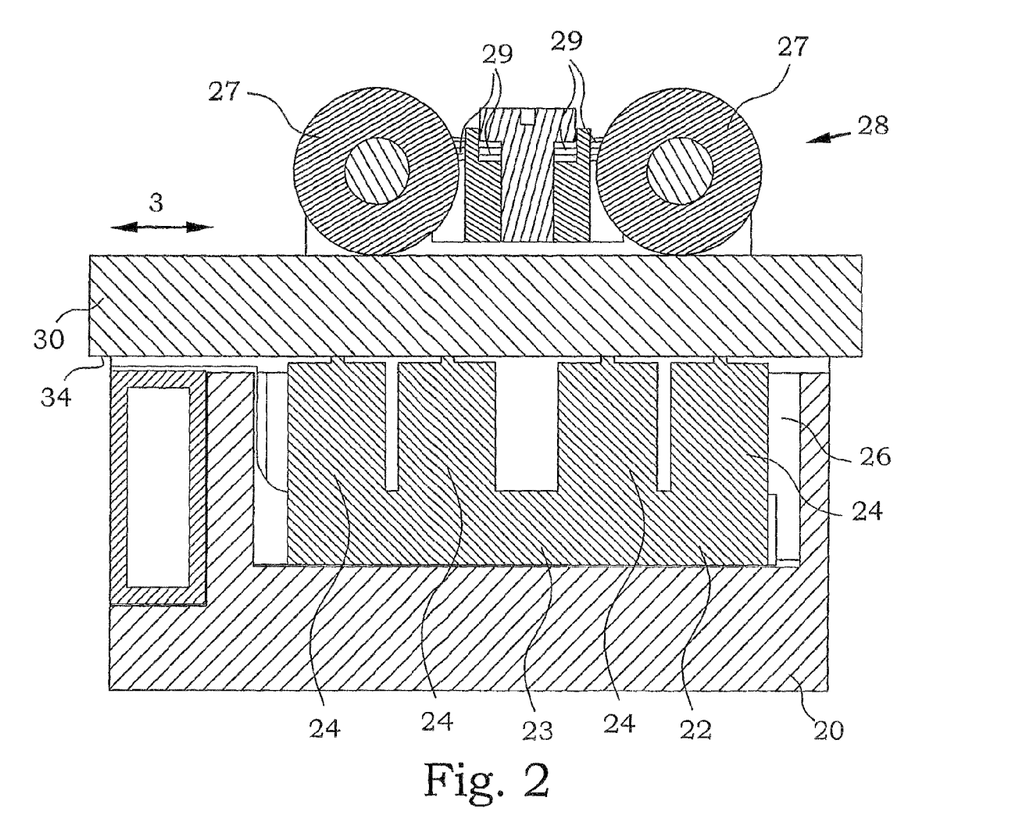
FIG. 2 is a cross section of an embodiment of an electromechanical motor that is an example of a motor possible to use in an electromechanical actuator arrangement according to the present invention.

A simple sketch of a PIEZO LEGS® type actuator is illustrated in FIG. 2. Here, an electromechanical motor 10, in this embodiment a piezoelectric motor, comprises in this embodiment four basic components: a monolithic drive unit 23 consisting of piezoelectric bimorph drive elements or actuators 24 and a contacting portion or interaction portion 25 on top of the actuators 24, a motor block 20 where the monolithic drive unit 23 is mounted, a rail 30 to be moved in relation to the actuators 24 and a spring unit 28 pressing a drive surface 34 of the rail 30 against the interaction portion 25 of the actuators 24.

A monolithic drive unit 23 comprises a passive backing 22 and actuators 24, made by multilayer techniques. In this embodiment, four actuators 24 are used, separated by cuts. Each actuator 24 is divided into two separately controllable phase segments 21. A number of phase and ground electrodes layers are alternatingly incorporated within the actuators 24, and terminations contact the phase and earth electrodes in the active areas in the actuators 24. The phase electrodes within each phase segment 21 are connected together and controlled by a single voltage. Phase electrodes of the other phase segments are independently controllable. By applying a suitable voltage to selected electrodes, electrical fields will be applied within the actuators and result in an expansion or contraction of the material between the phase electrode layers and earth electrode layers. This will result in a bending and/or expansion/contraction of the actuators 24. This actuator motion can by proper choices of the shapes of the applied voltages be translated to a motion of the rail 30.

The motor block 20 is typically of a metal, e.g. steel or aluminium and can be made with standard fabrications techniques such as milling. The motor block 20 has a cavity 26, where the drive unit 23 with its electrical carriers and connectors typically is mounted with a suitable resin. For protection of the drive unit 10, the cavity 26 is typically filled with some suitable flexible material such as silicon rubber.

The spring unit 28 consists of a spring 29 screwed to a ball bearing arrangement 27, in this embodiment comprising a ball bearing holder, ball bearings and sprints. The ball bearings are pressed by the spring 29, via sprints through the centre of the ball bearing, against the rail 30 to apply a normal load between the rail 30 and the drive unit 23. The spring 29 can be made in several ways and with several techniques. For ease of assembly and minimal number of components the spring 29 is preferably made in one piece by etching from large metal sheets.

The preferred mechanism for moving a rail 30 by such a unit is of a non-dynamic type. Let us choose the first and third actuators as the driving elements of a first set. These actuators are thus working synchronously. These actuators are in contact with the rail 30. Similarly, the second and fourth actuators belong to a second set. These actuators are thus also working synchronously. The actuators 24 are bimorphs with independently controllable voltages on the two sides of the bimorph. The top of the actuators 24, the interaction portions 25, can therefore move arbitrarily within a certain area, if no load is present. For an ideal bimorph and for small strokes, this area constitutes a rhomb. For a certain phase-shifted motion of the two sets of actuators 24, a motion of the rail 30 in a main displacement direction 3 according to the arrow is possible to achieve. If repetitive voltage signals are applied on the actuators 24, the interaction portions 25 will move along a certain trajectory within the admitted motion area.

More descriptions about this kind of actuators can be found in e.g. the U.S. Pat. Nos. 6,184,609, 6,337,532, 6,798,117, 7,067,958, 7,355,325, and 7,420,321.

A PIEZO LEGS® actuator can easily be manufactured with a flatness of the driving surface of even down to 0.1 μm. Depending on the actual applied voltage signals, flatness during motion in the interval of 0.5-1.5 μm may be achieved, i.e. even better than ordinary linear bearings. Roll and pitch can easily be kept within about 100 μrad. One limitation is the load on the actuator. Loads of the order of 5 N would, however, be perfectly possible to bear directly by an electromechanical actuator, e.g. of the kind presented above. In small moving arrangements, this permitted load would in most applications be perfectly sufficient.

Figure 3A:
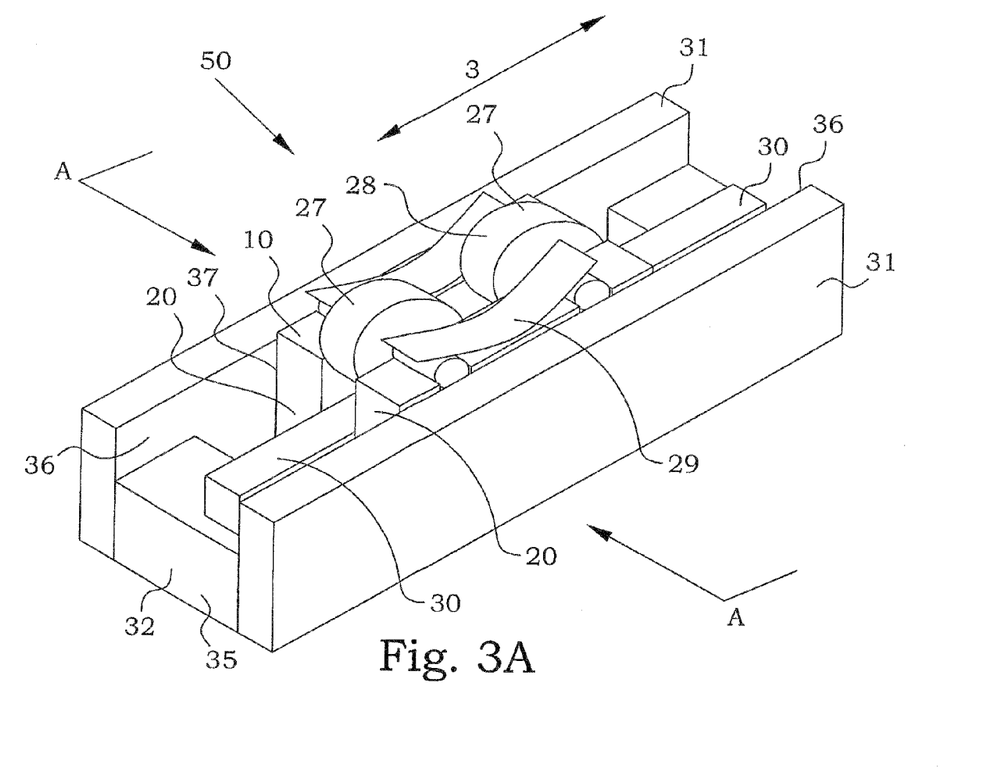
FIG. 3A is a schematic illustration of an embodiment of an electromechanical actuator arrangement according to the present invention.

As mentioned above, the largest accuracy drawback of electromechanical actuators are typically the uncertainty in straightness and yaw. However, due to the low expected load in these directions, the motor can be arranged to let the motor block be guided directly by guiding arrangements connected to the driven rail. FIG. 3A illustrates a schematic drawing of an electromechanical actuator arrangement according to an embodiment of the present invention. An electromechanical actuator arrangement 50 comprises an electromechanical motor 10 and a rail arrangement 35. The rail arrangement 35 has a rail 30 relative which the electromechanical motor 10 drives in a main displacement direction 3. The electromechanical motor 10 has electromechanically active actuators 24 attached to a motor block 20 and the actuators 24 are arranged to provide an actuating action against the drive surface (not seen in FIG. 3A) of the rail 30. The drive surface is parallel to the displacement direction 3. The actuating action takes place by means of an (not shown) interaction portion. The electromechanically active actuators 24 exhibit shape changes upon excitation, by which shape changes the above mentioned actuating action is caused.

The rail arrangement 35 has furthermore two guide members 31 provided parallel to the main displacement direction 3. The guide members 31 in this particular embodiment are parallel plates mechanically connected to the rail 30 and to each other by means of distance blocks 32. The guide members 31 have a respective guiding surface 36 facing the motor block 20. The motor block 20 has two guidance surfaces 37 provided at opposite and outer sides of the motor block 20. The guidance surfaces 37 in turn face a respective guiding surface 36 of the guide members. The idea of providing these guiding surfaces 36 and guidance surfaces 37 facing each other in close proximity is that the guide members 31 should form a track, in which the motor block 20 moves. Note that the motion is a relative motion, i.e. either or both of the electromechanical motor 10 and a rail arrangement 35 is moving. If the motor block 20 does not move straight, i.e. moves somewhat sideward, i.e. presenting a side displacement 6, one side of the motor block 20 will come into contact with one of the guide members 31 and a further side displacement 6 is prohibited. Analogously, if the motor block 20 exhibits a yaw rotation 7, at least one side of the motor block 20 will come into contact with a respective guide member 31, and any further rotation is prohibited. The motor block 20 and the guide members 31 thereby present a relative support for each other, resulting in a guiding of the electromechanical motor 10 along the rail 30.

Figure 3B:
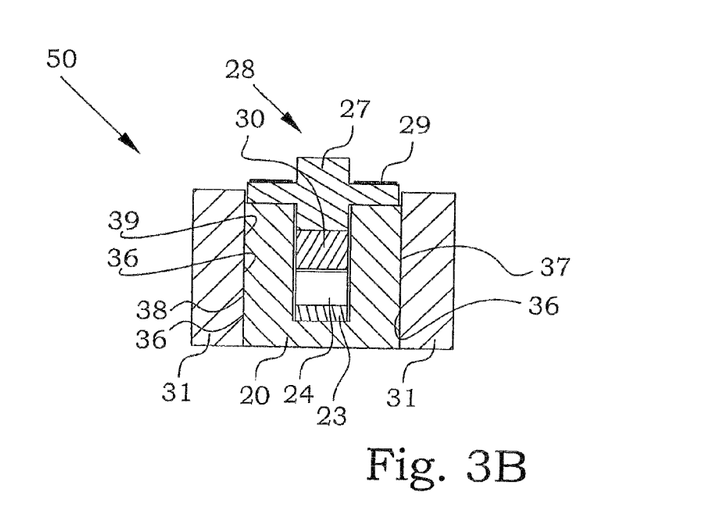
FIG. 3B is a cross-section of the embodiment of FIG. 3A.

As discussed further below, at least one of the surfaces providing the guiding function has to present a possible two-dimensional contact, i.e. a contact surface, while the other can be either another contact surface or a contact line. In other words, one of the guiding surface 36 and the guidance surface 37 has at least a tangent line in a first (imaginary) plane parallel to the main displacement direction 3 and transverse to the drive surface 34, and the other one of the guiding surface and said guidance surface 37 having a tangent surface in a second (imaginary) plane parallel to the first plane. This is easier to understand, referring to FIG. 3B, where the embodiment of FIG. 3A is illustrated in cross-section along the line A-A. In this embodiment, there is a tangent surface 38 at the motor block 20 as well as a tangent surface 39 at the guide members 31.

Figure 3C:
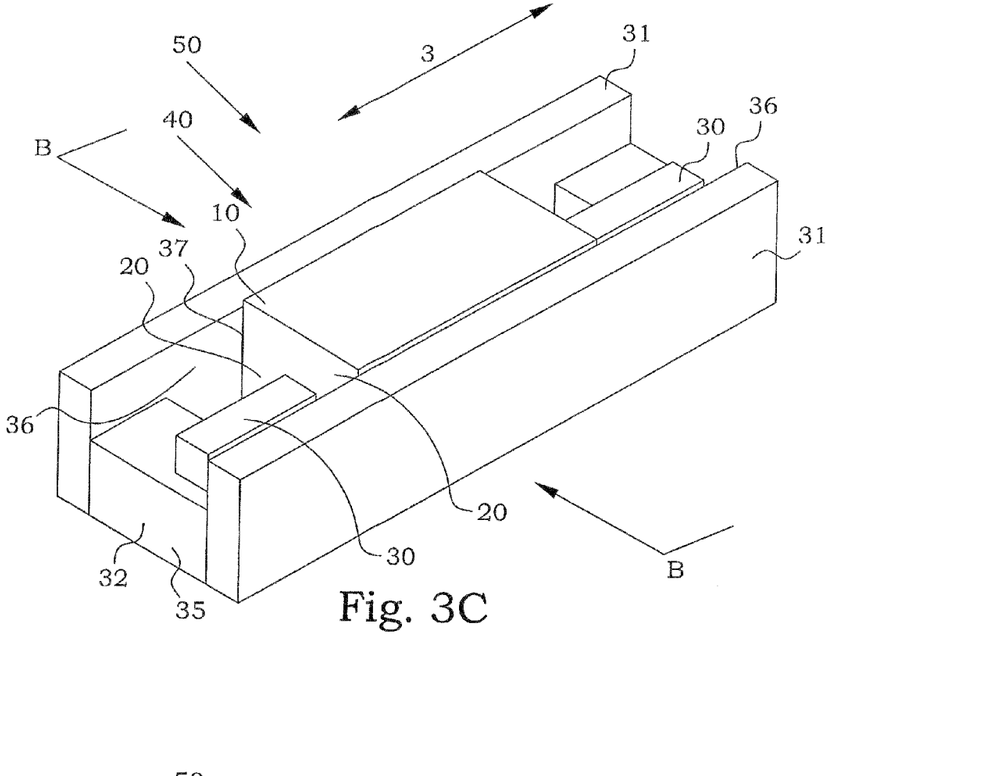
FIG. 3C is a schematic illustration of another embodiment of an electromechanical actuator arrangement according to the present invention.

The embodiment above has a spring arrangement for ensuring the contact force in the direction 4 perpendicular to the drive surface 34. In FIG. 3C another embodiment is schematically illustrated, instead presenting two electromechanical motors 10 arranged in a yoke arrangement 40. One electromechanical motor is arranged to operate on the rail 30 from below and the other electromechanical motor is arranged to operate on the rail 30 from above. In this manner, the contacting forces between the pair of electromechanical motors 10 and the rail 30 can be carefully adjusted without having to rely on spring elements.

Figure 3D:
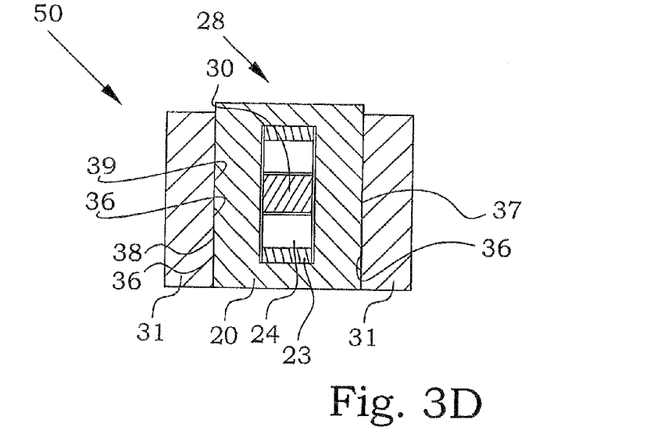
FIG. 3D is a cross-section of the embodiment of FIG. 3C.

The yoke arrangement 40 is even more clearly seen in FIG. 3D where the embodiment of FIG. 3C is illustrated in cross-section along the line B-B.

Figure 8:
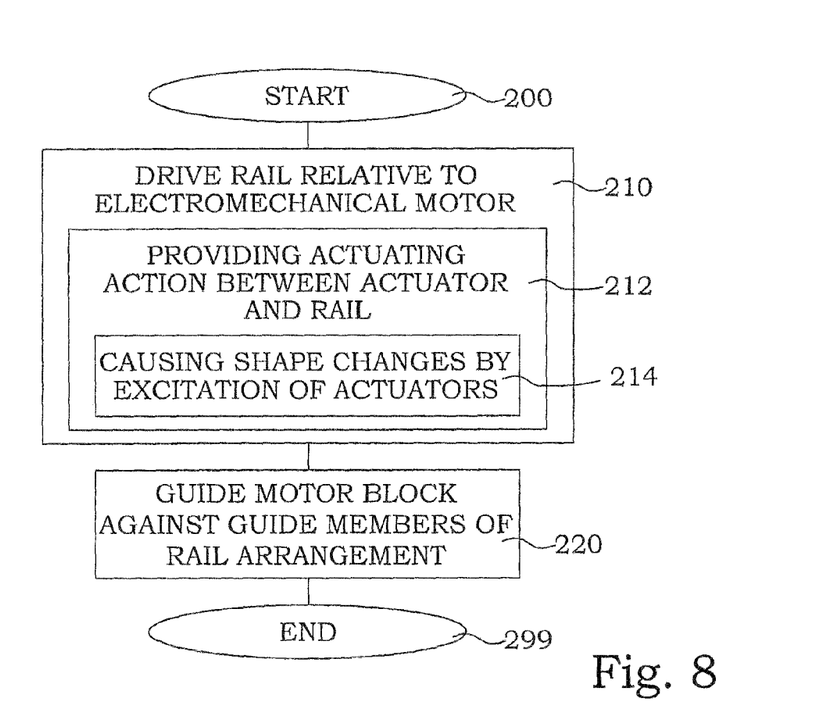
FIG. 8 is a flow diagram of an embodiment of a method according to the present invention.

FIG. 8 illustrates a flow diagram of an embodiment of a method according to the present invention. The method of driving an electromechanical actuator arrangement starts in step 200. In step 210, a rail of a rail arrangement is driven relative to an electromechanical motor in a main displacement direction. As indicated by step 212, this driving is performed by providing an actuating action of electromechanically active actuators of the electromechanical motor against a drive surface, parallel to the displacement direction, of the rail. As indicated by step 214, the actuating action is caused by shape changes of the electromechanically active actuators when being excited. In step 220 a surface of a motor block, to which said electromechanically active actuators are attached, is guided by mechanical interaction with at least one guide member of the rail arrangement, which guide member is provided parallel to the main displacement direction.

Figures 4A, 4B, 4C, 4D:
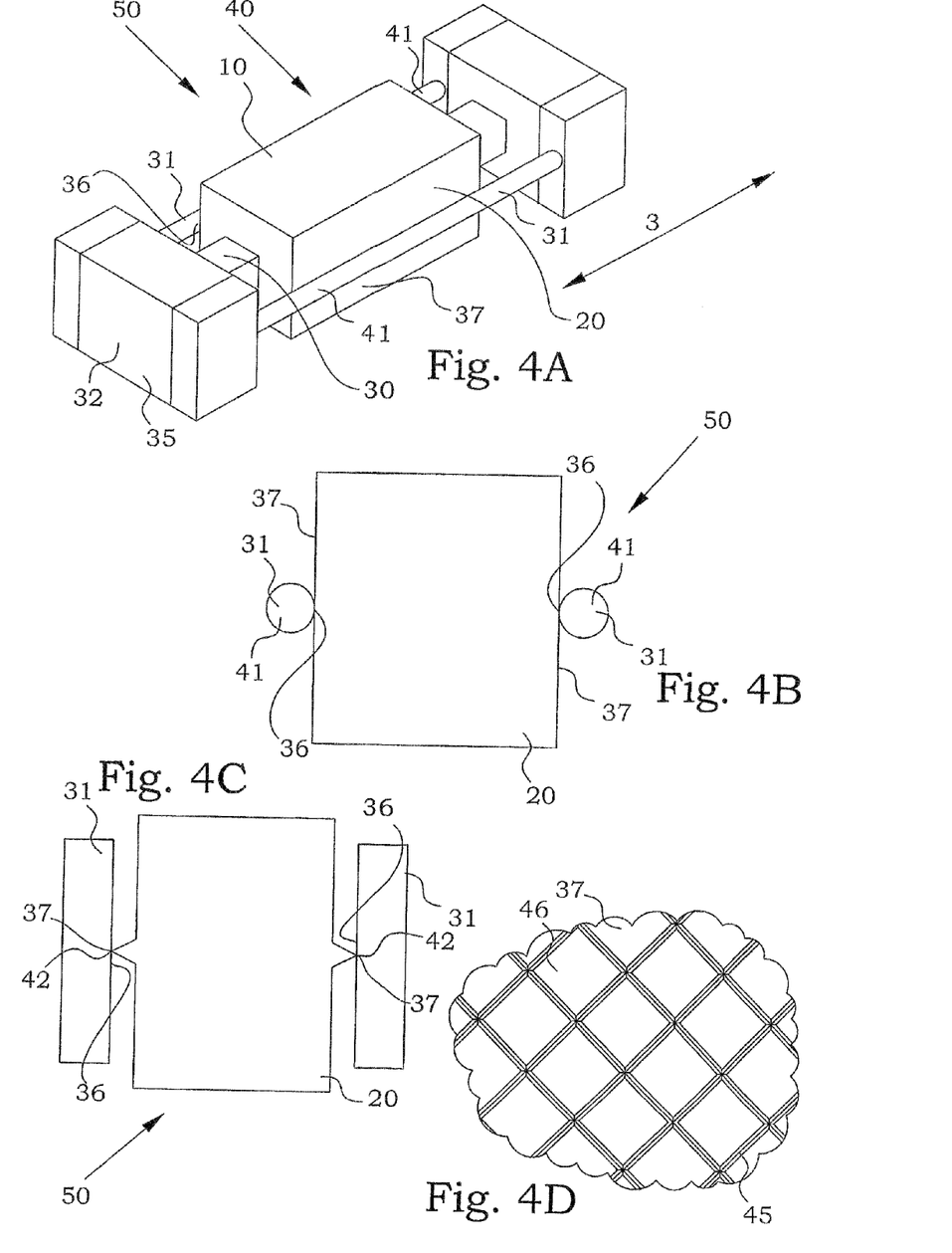
FIG. 4A is a schematic illustration of an embodiment of an electromechanical actuator arrangement according to the present invention using curved guiding surfaces.
FIG. 4B is a cross-section of the embodiment of FIG. 4A.
FIG. 4C is a schematic illustration of an embodiment of an electromechanical actuator arrangement according to the present invention using guidance surfaces providing a line contact.
FIG. 4D is a schematic illustration of an embodiment of a guidance surface.

As briefly mentioned above, the available contact planes at the motor block 20 and the guide members 31 can be configured in different manners. FIG. 4A illustrates another embodiment of an electromechanical actuator arrangement 50. Here, the motor block 20 has a guidance surface 37 presenting a tangent surface in a plane parallel to the main displacement direction 3 and transverse to the drive surface 34 as in earlier embodiments. However, the guide members 31 are in this embodiment rods 41 with a circular cross-section. This leads to that the guiding surface 36 is a curved surface, having only a tangent line in the plane parallel to the main displacement direction 3 and transverse to the drive surface 34. This is even better understood by referring to FIG. 4B, where the embodiment of FIG. 4A is illustrated in cross-section.

FIG. 4C illustrates yet another embodiment, in cross-section, of an electromechanical actuator arrangement 50. Here, the opposite relation, compared to FIG. 4A is utilized. The motor block 20 has here a guidance surface 37 presenting an edge 42, which means that in a plane parallel to the main displacement direction 3 and transverse to the drive surface 34, only a tangent line is provided. However, in this embodiment, the guide members 31 have rectangular shapes, with a side parallel to the plane parallel to the main displacement direction 3 and transverse to the drive surface 34. This means that the guiding surface 36 is a flat surface, having a tangent surface in a plane parallel to the main displacement direction 3 and transverse to the drive surface 34.

Anyone skilled in the art realizes that the shape of the guidance surface 37 and the guiding surface 36 can be varied in many different ways, while still giving a guiding action when interacting. For instance, the tangent surface or tangent line of the guidance surface 37 and the guiding surface 36 do not necessarily have to be continuous. In FIG. 4D, a guidance surface 37 of a particular embodiment is illustrated. Here, the guidance surface 37 has a main surface 45 interrupted by grooves 46. The main surface 45 is predominating, providing a reliable guiding action, while the grooves 46 may hold impurities or debris. This often makes the lapping operations easier to perform. Likewise, also the guiding surface of the guide members can be split into part surfaces. Here, it is important that any structures on the guiding surface do not open up for getting stuck with e.g. a front corner of the corresponding guidance surface 37.

The guidance surface 37 has to have a certain extension in the main displacement direction to provide a reliable guiding. In a typical arrangement, the guidance surface 37 has an extension in the main displacement direction that is larger than a width of the rail in the y direction, i.e. in a direction perpendicular to the plane of the guidance surface 37.

The distance between the guidance surface 37 and the guiding surface 36 sets the accuracy in the straightness of travel, i.e. the maximum side displacement. Accuracy in yaw is also determined by the distance between the guidance surface 37 and the guiding surface 36 as well as on the maximum distance in the main displacement direction between points on the tangent line or tangent surface of the motor block 20. A closer relation between the guidance surface 37 and the guiding surface 36 ensures a straighter relative motion between the motor block 20 and the guide members 31.

Figure 5A:
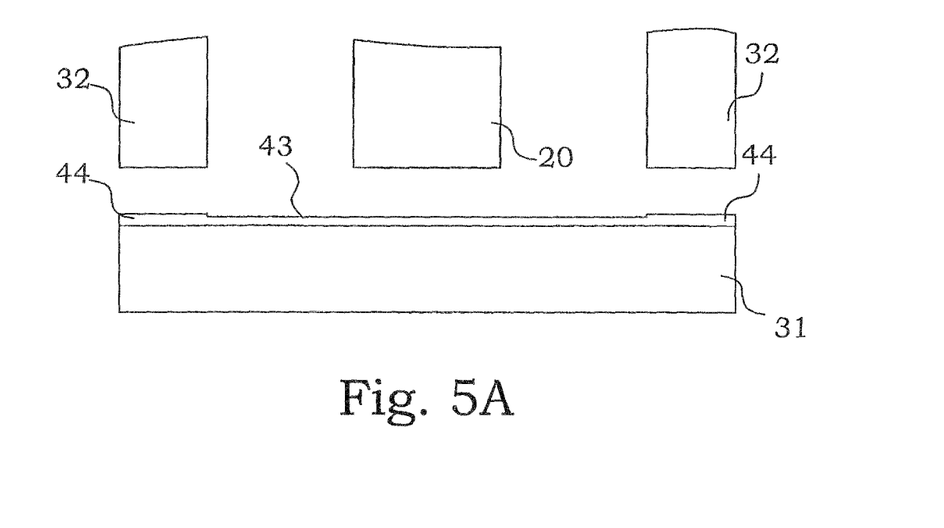
FIG. 5A is a schematic illustration of an embodiment of a guide member.

The distance between the guidance surface 37 and the guiding surface 36 can easily be controlled during manufacturing, e.g. by providing distance blocks 32 with a width exactly matching the width of the motor block 20. This can, with reference to an exploded illustration of a part of an electromechanical actuator arrangement 50 in FIG. 5A, e.g. be provided by a jointly performed lapping of the motor block 20 and the distance blocks 32. The guide members 31 can then be produced starting with a perfectly plane surface onto which well controlled surface coating 43 can be provided. The surface coating can be made slightly thicker at the positions 44 where the guide members 31 are to be attached to the distance blocks 32. Since there are modern coating techniques which allows for extremely well controlled thicknesses, the total distance between the guidance surface 37 and the guiding surface 36 can easily be controlled to below 0.1 μm.

Figure 5B:
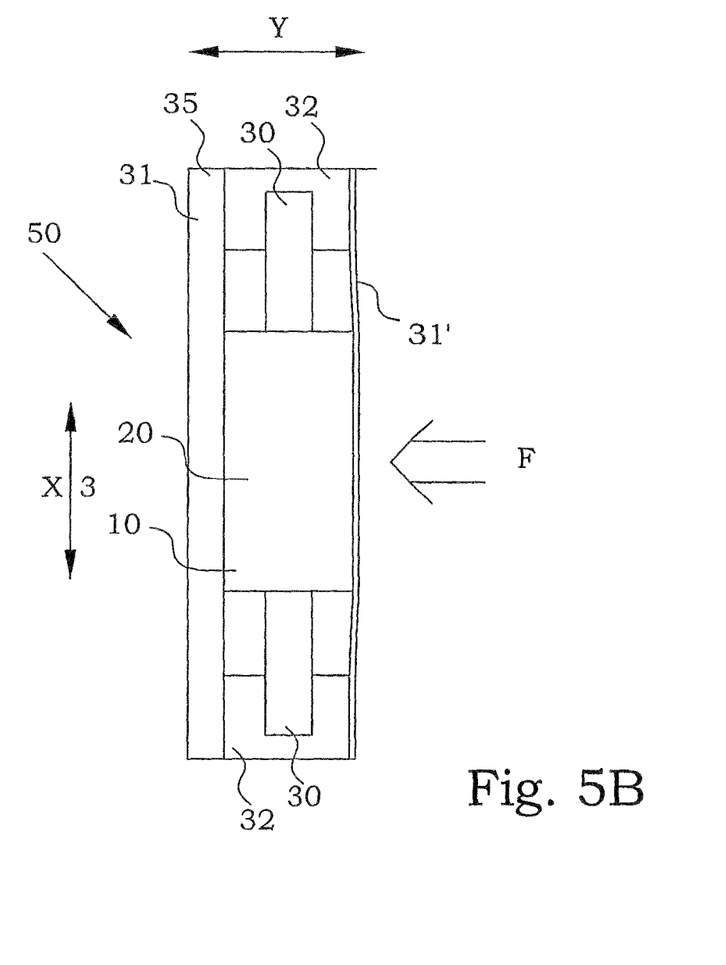
FIG. 5B is a schematic illustration of an embodiment of an electromechanical actuator arrangement according to the present invention providing a pressing force between a motor block and a guide member.

In the embodiment above, two rigid guide members 31 have been provided on a respective side of the motor block 20. However, as illustrated in FIG. 5B, a slightly resilient guide member 31' could also be utilized for providing a pressing force N against a rigid guide member 31. The resilient guide member 31' can be made in the same manner as the rigid guide member 31 but with a thinner dimension in the y direction. By making the distance between the guiding surface 36 of the resilient guide member 31' and the guiding surface 36 of the rigid guide member 31 equal or even less than the thickness of the motor block 20, a pressing force N is applied in the y direction. In such a way, the motion of the motor block 20 is assured to be conducted along the guiding surface 36 of the rigid guide member 31, and the accuracy can be very good indeed.

In alternative embodiments, the pressing force can also be provided by other means, e.g. by external spring elements, by magnetic interaction, by electrostatic interactions etc. The advantage of such solutions is that a very good control of also the side movement of the motor block is achieved. The largest disadvantage is, however, that any additional means for providing the pressing force may occupy valuable volume around the electromechanical actuator arrangement.

Figure 6A:
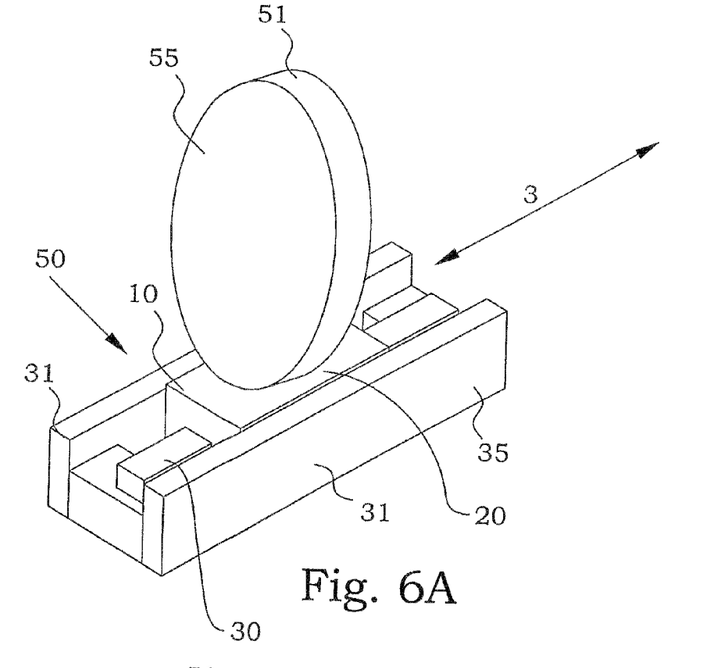
FIG. 6A is a schematic illustration of an embodiment of an electromechanical actuator arrangement according to the present invention having an object to be moved attached to a motor block.

The electromechanical actuator arrangement is intended to be directly connected to an object to bear and move. One embodiment is illustrated in FIG. 6A. Here an object 55 is attached to the motor block 20, in this embodiment in a yoke arrangement 40. The object 55 thereby applies a load between the drive surface 34 of the rail 30 of the rail arrangement 35 and the interaction portion 25 of the actuators 24 of the electromechanical motor 10.

The interface between the drive surface 34 and the interaction portion 25 is thereby exposed for at least a part of the load of the object. In the present embodiment, the object is a lens 51. Most objects to be moved by such small electromechanical actuator arrangement are of very low weight, and the load between the interaction portion 25 and the drive surface 34 is low enough to still allow a reliable motor action. By suitable design of the electromechanical motor 10, loads of several Newtons can be supported in this way.

Figure 6B:
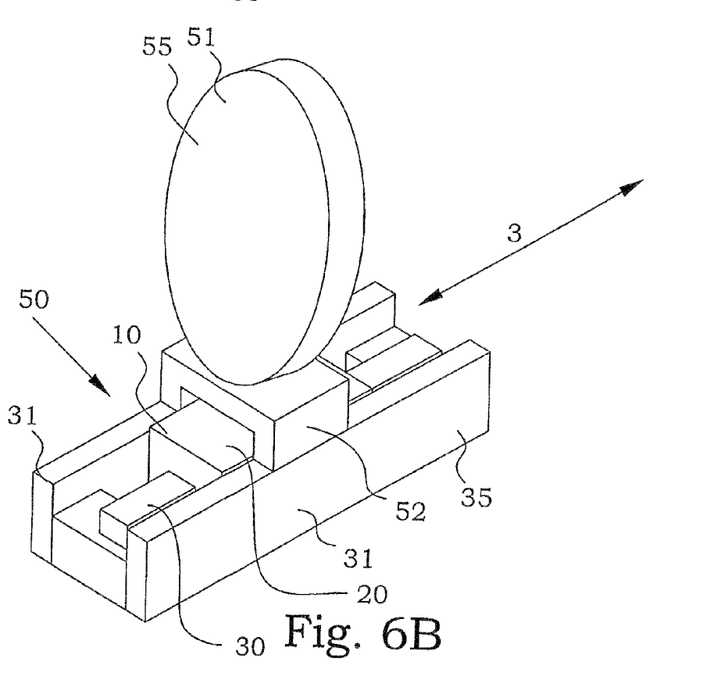
FIG. 6B is a schematic illustration of an embodiment of an electromechanical actuator arrangement according to the present invention having an object to be moved attached to a rail arrangement.

Since the motion of the electromechanical motor 10 relative the rail 30 is a relative motion, one may select to attach the object 55 to the rail arrangement 35 instead, and have the electromechanical motor 10 fixed. FIG. 6B illustrates such a solution. A bridge 52 is attached between the guide members 31, onto which bridge 52 the object is fixed. By fixing the position of the motor block 20, the rail arrangement 35 will instead move and thereby bring the object 52 with it.

If a load is attached to the rail arrangement 35, the torque on the interface between the interaction portion 25 and the drive surface 34 may differ depending on the actual relative position. If the drive mechanism of the electromechanical motor 10 is sensitive to such torques, it might be necessary to provide additional arrangements to support at least a part of the changing torque. Also when a load is attached in an asymmetric manner to the motor block 20, additional support arrangements might have to be used.

Figure 7A:
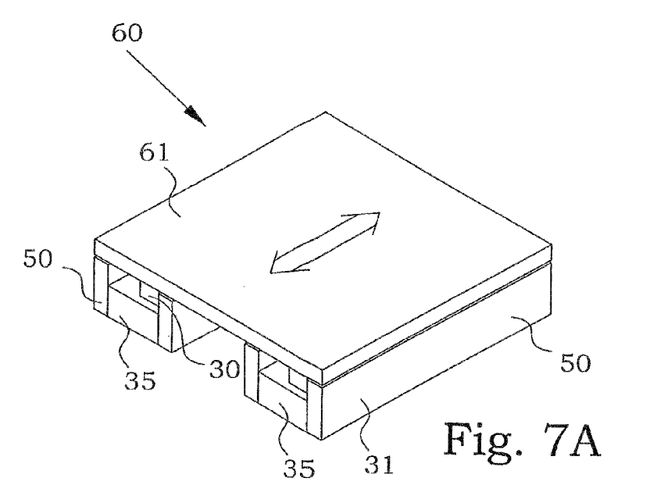
FIG. 7A is a schematic illustration of a table movable in one dimension comprising electromechanical actuator arrangement according to the present invention.

FIG. 7A illustrates a table arrangement 60, based on two electromechanical actuator arrangements 50. A table plate 61 is connected to the motor block (not seen in FIG. 7A) of both electromechanical actuator arrangements 50. By driving the electromechanical motors (not seen in FIG. 7A) of the two electromechanical actuator arrangements 50 in a same manner, a one-axis motion of the table plate 61 is achieved. In this manner, the present ideas around electromechanical actuator arrangements 50 can be utilized to provide movable table configurations with extremely simple arrangements. If yoke arrangements are used in the electromechanical actuator arrangements 50, the movable table can be achieved without any bearings at all. In an alternative table arrangement, the table plate 61 can of course also be attached to the rail arrangement 35 instead.

Figure 7B:
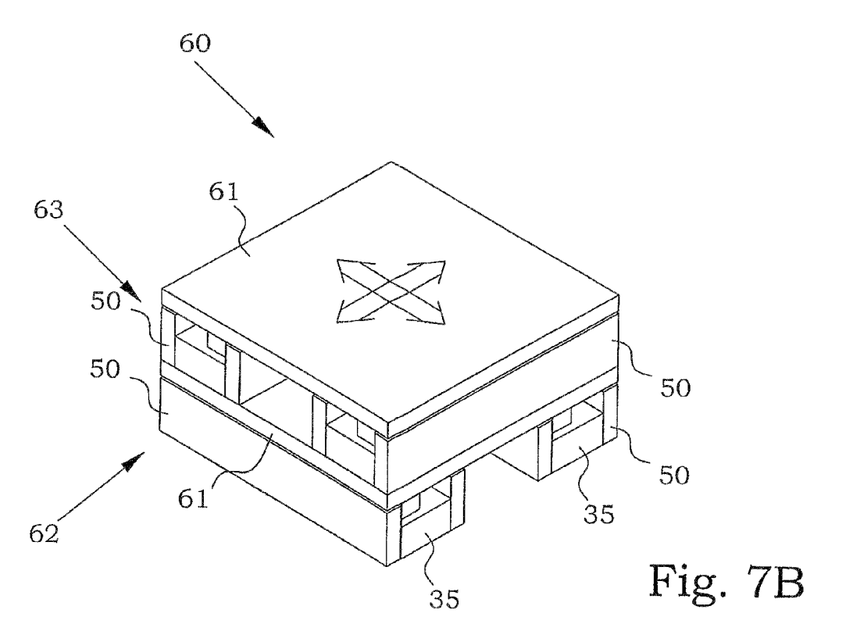
FIG. 7B is a schematic illustration of a table movable in two dimensions comprising electromechanical actuator arrangement according to the present invention.

A table arrangement 60 can also be provided with a two-dimensional motion possibility, as illustrated in FIG. 7B. In this embodiment, four electromechanical actuator arrangements 50 are arranged in two levels, where the electromechanical actuator arrangements 50 in the bottom layer 62 moves a table plate 61 in one direction. On top of the table plate 61 of the bottom layer 62 are the electromechanical actuator arrangements 50 of the top layer 63 attached. This top layer 63 is arranged for a motion perpendicular to the motion of the bottom layer 62. In such a manner, the table plate 61 of the top layer 63 can be moved any arbitrary two-dimensional path within the stroke of the electromechanical motors. Such a two-dimensionally movable table can be designed to be very small.

Figure 7C:
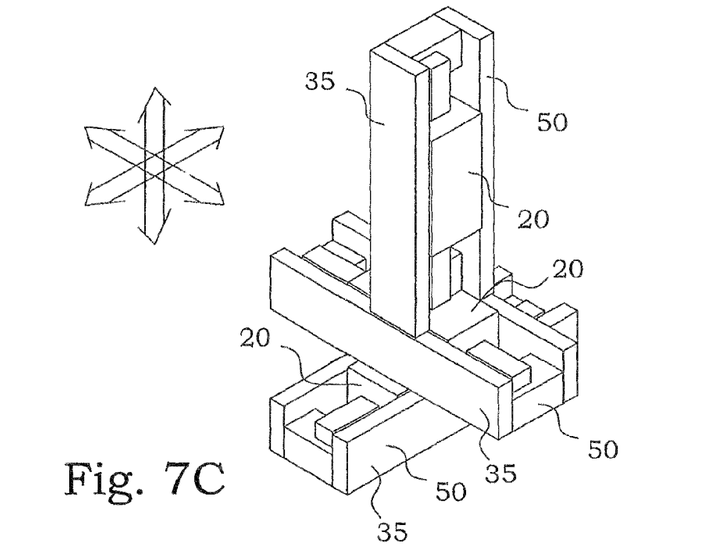
FIG. 7C is a schematic illustration of an aggregate of electromechanical actuator arrangements enabling a three-dimensional motion.

The same principle is possible to extend also into three dimensions, as illustrated in FIG. 7C. Here, three electromechanical actuator arrangements 50 are mechanically connected by connecting a rail arrangement 35 of one electromechanical actuator arrangement 50 to the motor block 20 of another electromechanical actuator arrangement 50. By fixing the rail arrangement 35 of one electromechanical actuator arrangement 50 and attaching a load to the motor block 20 of the last electromechanical actuator arrangement 50 in this chain, a three-dimensional motion of the load can be achieved.

The relative connections between the electromechanical actuator arrangements 50 can alternatively be arranged in different configurations where any combination of motor block 20 and rail arrangement 35 can be the attaching portion, as long as the "middle" electromechanical actuator arrangements 50 utilizes both the motor block 20 and the rail arrangement 35 for connecting the other electromechanical actuator arrangements 50.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Electromechanical actuator arrangement, comprising:
   an electromechanical motor;
   a rail arrangement;
   said rail arrangement having a rail relative which said electromechanical motor drives in a main displacement direction;
   said electromechanical motor having electromechanically active actuators attached to a motor block and arranged to provide an actuating action against a drive surface, parallel to said displacement direction, of said rail by means of an interaction portion;
   said electromechanically active actuators exhibit shape changes upon excitation, by which shape changes said actuating action is caused;
   said rail arrangement further having at least one guide member provided parallel to said main displacement direction;
   said at least one guide member has a guiding surface facing said motor block;
   said motor block having a guidance surface facing said guiding surface of said at least one guide member;
   one of said guiding surface and said guidance surface having at least a tangent line in a first plane parallel to said main displacement direction and transverse to said drive surface;
   the other one of said guiding surface and said guidance surface having a tangent surface in a second plane parallel to said first plane;
   said rail arrangement has two guide members provided parallel to said main displacement direction on opposite sides relative said motor block;
   said two guide members have a respective guiding surface facing said motor block; and
   said motor block having two outer guidance surfaces facing a respective one of said guiding surfaces of said two guide members.

2. Electromechanical actuator arrangement according to claim 1, wherein said guidance surface of said motor block is an outer surface of said motor block.

3. Electromechanical actuator arrangement according to claim 2, wherein said at least a tangent line of said one of said guiding surface and said guidance surface being part of a tangent surface in said first plane.

4. Electromechanical actuator arrangement according to claim 2, wherein said guiding surface and said guidance surface being positioned in close proximity of each other.

5. Electromechanical actuator arrangement according to claim 2, wherein said at least a tangent line or said tangent surface of said guidance surface having an extension in said main displacement direction that is larger than a width of said rail in a direction perpendicular to said first plane.

6. Electromechanical actuator arrangement according to claim 2, further comprising an object to be moved, attached to one of said rail arrangement and said motor block; said object being arranged in such a way that a load is applied between said rail arrangement and said motor block.

7. Electromechanical actuator arrangement according to claim 1, wherein said at least a tangent line of said one of said guiding surface and said guidance surface being part of a tangent surface in said first plane.

8. Electromechanical actuator arrangement according to claim 7, wherein said guiding surface and said guidance surface being positioned in close proximity of each other.

9. Electromechanical actuator arrangement according to claim 7, wherein said at least a tangent line or said tangent surface of said guidance surface having an extension in said main displacement direction that is larger than a width of said rail in a direction perpendicular to said first plane.

10. Electromechanical actuator arrangement according to claim 7, further comprising an object to be moved, attached to one of said rail arrangement and said motor block; said object being arranged in such a way that a load is applied between said rail arrangement and said motor block.

11. Electromechanical actuator arrangement according to claim 1, wherein said guiding surface and said guidance surface being positioned in close proximity of each other.

12. Electromechanical actuator arrangement according to claim 11, wherein said at least a tangent line or said tangent surface of said guidance surface having an extension in said main displacement direction that is larger than a width of said rail in a direction perpendicular to said first plane.

13. Electromechanical actuator arrangement according to claim 11, further comprising an object to be moved, attached to one of said rail arrangement and said motor block;
    said object being arranged in such a way that a load is applied between said rail arrangement and said motor block.

14. Electromechanical actuator arrangement according to claim 1, wherein said at least a tangent line or said tangent surface of said guidance surface having an extension in said main displacement direction that is larger than a width of said rail in a direction perpendicular to said first plane.

15. Electromechanical actuator arrangement according to claim 14, further comprising an object to be moved, attached to one of said rail arrangement and said motor block;
    said object being arranged in such a way that a load is applied between said rail arrangement and said motor block.

16. Electromechanical actuator arrangement according to claim 1, further comprising an object to be moved, attached to one of said rail arrangement and said motor block; said object being arranged in such a way that a load is applied between said rail arrangement and said motor block.

17. Electromechanical actuator arrangement according to claim 1, wherein said guide members are parallel plates connected to each other and to said rail by distance blocks.

18. Electromechanical actuator arrangement according to claim 17, wherein said distance block has a same width as said motor block in a direction perpendicular to said first plane;
said parallel plates being attached to said distance block by an attachment portion protruding out towards the distance blocks from a main surface of said parallel plates.

19. Electromechanical actuator arrangement according to claim 17, wherein said distance block have a width that is slightly larger than said motor block in a direction perpendicular to said first plane.

20. Electromechanical actuator arrangement according to claim 1, wherein said shape changes comprise a dimension change in a longitudinal direction transverse to said drive surface, directed between an attachment point of said actuators to said motor block and said interaction portion and a bending of said actuators perpendicular to said longitudinal direction and parallel to said main displacement direction.

* * * * *